Patented May 23, 1950

2,508,450

UNITED STATES PATENT OFFICE 2,508,450

5 - (p- AMINOBENZENE SULFONAMIDO) - 1,3 DIMETHYL-2,4 DIOXO - 6 - AMINO-TETRA-HYDROPYRIMIDINE AND ITS PREPARATION

André Demolis, Zofingen, Switzerland, assignor to Aktiengesellschaft vorm. B. Siegfried, Zofingen, Switzerland No Drawing. Application June 19, 1947, Serial No. 755,721. In Switzerland March 12, 1942

Section 1, Public Law 690, August 8, 1946
Patent expires March 12, 1962

6 Claims. (Cl. 260—239.6)

This invention relates to new paraaminobenzene sulfonamides and processes for making the same and more particularly to 5-(p-aminobenzene sulfonamido)-1,3-dimethyl-2,4-dioxo-6-amino-tetrahydropyrimidine and its production.

In accordance with one embodiment a compound containing the radical of an acylated sulfanilic acid, for example, a derivative of an acyl sulfanilic acid such as a halide, an ester, or the free acid itself, is condensed with 1,3-dimethyl-2,4-dioxo-5,6-diamino - tetrahydropyrimidine, (such as disclosed in Beilstein volume 25, page 482, and Beilstein supplemental volume 25, page 696), and the product of this reaction, having a melting point of 268°–272° C., is treated with a hydrolyzing agent. The 5-(p-aminobenzene sulfonamido)-1,3 - dimethyl - 2,4 - dioxo-6-amino - tetrahydropyrimidine is a white crystalline powder having a melting point of 250°–252° C. and is soluble in alkalies and acids. It is used as a pharmaceutical product or for the preparation of such products.

Other known reactive benzene sulfonic acid compounds, such as the acids themselves or their derivatives having a benzene sulfonic acid radical and having a nitrogen-containing substituent convertible into an amino group in the para position, may be used in this process. The reactive benzene sulfonic acid compounds of this invention may be represented by the formula:

wherein X is a nitrogen-containing substituent convertible into the NH$_2$-group; and R, a substituent which reacts with a primary amino group by splitting off RH. Such compounds include, in addition to the previously mentioned acylated sulfanilic acid compounds, p-nitro benzene sulfonic acid compounds such as the acids themselves, their halides, or their esters. More specifically, in such compounds, for example, X may represent an AcNH-radical where Ac is an acyl radical e. g. the formyl or acetyl radical or the NO$_2$-radical. The AcNH-radical is converted to the NH$_2$-radical by hydrolysis, while the nitro group is converted to the NH$_2$-radical by conventional procedures using a reducing agent.

Example 1

Sixty-five parts acetyl sulfanilic acid chloride is reacted with 44.2 parts of 1,3-dimethyl-2,4-dioxo-5,6-diamino-tetrahydropyrimidine by heating them in a solvent, as, for example, pyridine, on a water bath. The product of this reaction, which is precipitated upon dilution with water, is then filtered and washed. The so-obtained acetyl sulfanilamido - 1,3-dimethyl-2,4-dioxo-6-amino-tetrahydropyrimidine after drying has a melting point of 268°–272° C. It is hydrolyzed in a dilute alcoholic hydrochloric acid solution, then an excess of sodium acetate is added, and the obtained 5-(p-aminobenzene sulfonamido)-1,3-dimethyl - 2,4-dioxo-6-amino-tetrahydropyrimidine is filtered and dried. It is a white crystalline powder, which, when pure, melts between 250°–252° C. and upon analysis corresponds to the formula C$_{12}$H$_{15}$O$_4$N$_5$S.

N: calculated: 21.53 per cent, ascertained: 21.50 per cent.

The product is soluble in alkalies and acids and shows the diazo-reaction.

The new compound is effective against bacteria of the typhus—(*Eberthella typhosa*), paratyphus and enteritis—group, of the dysenteria group and bacterium coli.

It is distinguished by its high insolubility and is resorbed only little by the intestinal mucuous membrane, however sufficiently to suppress the bacillaemia encountered with *typhus abdominalis* and paratyphus Schottmueller and it produces a local effect in the intestinal tract due to its high concentration therein.

Example 2

A suspension of 170 grams 1,3-dimethyl-2,4-dioxo-5,6-diamino-tetrahydropyrimidine in 500 cubic centimeters pyridine is gradually mixed with 230 grams p-nitrobenzene-sulfochloride at room temperature. After the reactants are added, the mixture is heated to 60° C. and stirred at this temperature for one hour. After cooling, 3 liters of water is added and the mixture allowed to stand for some time, whereupon the mixture is filtered. The residue is heated several hours with 200 grams of pulverized iron in a dilute solution of ethyl alcohol and hydrochloric acid. Then the ethanol is distilled off and the residue mixed with a dilute sodium hydroxide solution and filtered. After neutralization with hydrochloric acid, the 5-(p-aminobenzene-sulfonamido)-1,3-dimethyl - 2,4 - dioxo-6-amino-tetrahydropyrimidine crystallizes in fine slightly brownish crystals. The desired reaction product is purified by dissolving it in a dilute sodium hydroxide solution and precipitating it therefrom with hydrochloric acid. The melting point of the purified crystals is 250°–252° C.

It will be understood that the examples disclosed herein, the proportions used, and the specific reaction conditions specified are illustrative and that the invention is not limited thereto but extends to equivalents encompassed within the scope of the invention which is defined by the appended claims.

I claim:

1. A process for producing 5-(p-aminobenzene sulfonamido) - 1,3-dimethyl-2,4-dioxo-6-amino-tetrahydropyrimidine which comprises reacting a benzene sulfonic acid compound selected from the group consisting of benzene sulfonic halides and benzene sulfonic esters having a nitrogen-containing substituent convertible into the amino group in the para position selected from the group consisting of $NO_2$ and acylamino radicals with 1,3 - dimethyl-2,4-dioxo-5,6-diamino-tetra-hydropyrimidine to produce a 5-(benzene-sulfonamido) - 1,3-dimethyl-2,4-dioxo-6-amino-tetrahydropyrimidine having said nitrogen-containing substituent in the para position of the benzene ring, and converting said nitrogen-containing substituent of the obtained reaction product into the $NH_2$-group.

2. A process for producing 5-(p-aminobenzene sulfonamido)-1,3-dimethyl-2,4-dioxo-6 - amino-tetrahydropyrimidine which comprises reacting a p-acylaminobenzene sulfonic acid halide with 1,3-dimethyl-2,4-dioxo-5,6 - diaminotetrahydropyrimidine to produce a 5-(p-acylamino-benzene sulfonamido)-1,3-dimethyl-2,4-dioxo - 6-amino-tetrahydropyrimidine, and converting the acylamino substituent of the obtained reaction product into the $NH_2$-group by hydrolysis.

3. A process for producing 5-(p-aminobenzene sulfonamido)-1,3 - dimethyl-2,4-dioxo-6-amino-tetrahydropyrimidine which comprises reacting a p-acetylaminobenzene sulfonic acid chloride with 1,3 - dimethyl-2,4-dioxo-5,6-diamino-tetra-hydropyrimidine to produce a 5-(p-acetylamino-benzene sulfonamido)-1,3-dimethyl-2,4-dioxo-6-amino-tetrahydropyrimidine, and converting said acetylamino substituent of the obtained reaction product into the $NH_2$-group by hydrolysis with alcoholic hydrochloric acid.

4. A process for producing 5-(p-aminobenzene sulfonamido)-1,3-dimethyl - 2,4-dioxo-6-amino-tetrahydropyrimidine which comprises reacting a p-nitrobenzene sulfonic acid halide with 1,3-dimethyl-2,4-dioxo-5,6-diamino-tetrahydropyrimidine to produce 5-(p-nitrobenzene sulfonamido)-1,3 - dimethyl-2,4-dioxo-6-amino - tetrahydropyrimidine, and converting said nitro substituent of the obtained reaction product into the $NH_2$-group with a reducing agent.

5. A process for producing 5-(p-aminobenzene sulfonamido) - 1,3-dimethyl-2,4-dioxo-6-amino-tetrahydropyrimidine which comprises reacting a p-nitrobenzene sulfonic acid chloride with 1,3-dimethyl-2,4-dioxo-5,6 - diamino - tetrahydropyrimidine to produce 5-(p-nitrobenzene sulfonamido)-1,3-dimethyl-2,4-dioxo - 6 - amino-tetrahydropyrimidine, and converting said nitro substituent of the obtained reaction product into the $NH_2$-group with a reducing agent.

6. A new compound, 5-(p-aminobenzene sulfonamido)-1,3-dimethyl-2,4-dioxo-6-amino - tetrahydropyrimidine.

ANDRÉ DEMOLIS.

REFERENCES CITED

The following references are of record in the file of this patent:

UNITED STATES PATENTS

| Number | Name | Date |
| --- | --- | --- |
| 2,351,333 | Gysin | June 13, 1944 |
| 2,407,966 | Sprague | Sept. 17, 1946 |

FOREIGN PATENTS

| Number | Country | Date |
| --- | --- | --- |
| 226,688 | Switzerland | July 16, 1943 |

OTHER REFERENCES

Bocker et al., Recueil Trav. Chim. des Pays-Bas, vol. 64 (1945), pp. 115-121.